Nov. 18, 1941.  W. W. FISCUS  2,263,237

SINGLE ACTION FISHING REEL

Filed Oct. 18, 1939

INVENTOR.
W. W. Fiscus
BY
ATTORNEY

Patented Nov. 18, 1941

2,263,237

UNITED STATES PATENT OFFICE 2,263,237

SINGLE ACTION FISHING REEL

Walter W. Fiscus, Sacramento, Calif.

Application October 18, 1939, Serial No. 299,998

1 Claim. (Cl. 242—84.5)

This invention relates in general to an improvement in fishing tackle, and in particular the invention is directed to an improved fishing reel and one especially useful for casting or trolling.

The principal object of the present invention is to provide, in a fishing reel of the free spool type, a novel assembly to effect a friction drag on the reel spool or a friction drive thereof selectively; the effectiveness of the drag or drive being controlled through the medium of a single, readily accessible manually actuated member.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
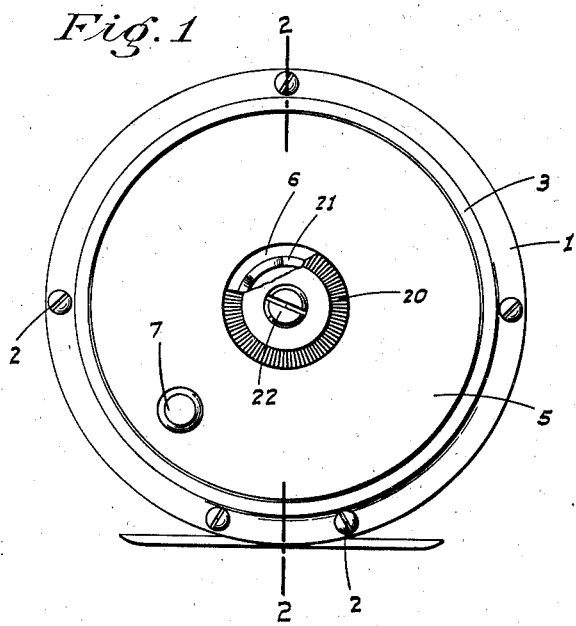
Figure 1 is a side elevation of the reel.
Figure 2:
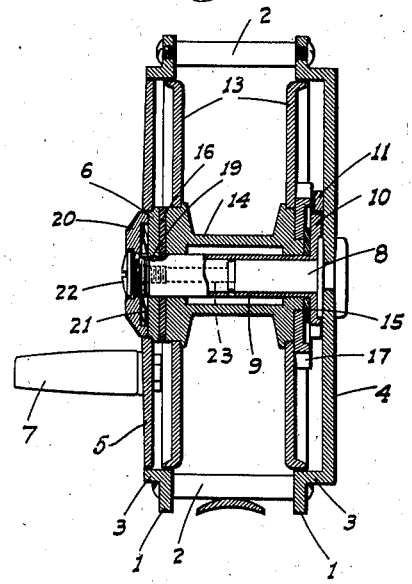
Figure 2 is a transverse section on line 2—2 of Fig. 1.
Figure 3:
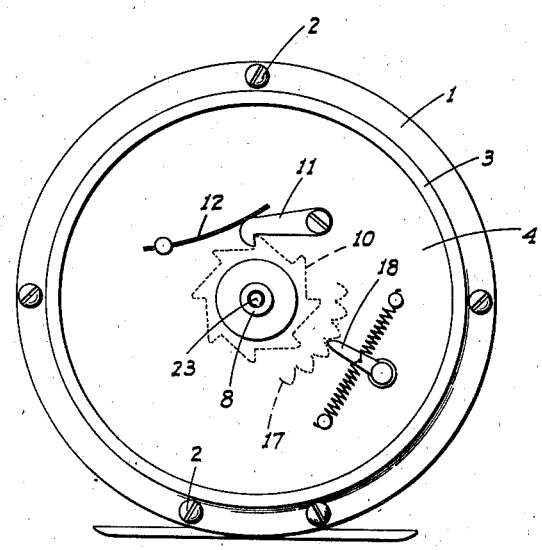
Figure 3 is a side elevation of the reel with the spool, and near side plate, and connected parts removed.

Referring now more particularly to the characters of reference, the reel comprises a body which includes a pair of annular laterally spaced rings 1 secured together by circumferentially spaced tie bolts 2; there being flanges 3 which project laterally out from the inner edges of said rings. One side of the body is closed by a side plate 4 formed integral with the corresponding flange 3, while the other side is closed by an annular and rotatable side plate 5 supported by a central disc-like hub 6 fixed thereon. A crank handle 7 is fixed on side plate 5 off center and projects laterally outward.

A stub shaft 8 is fixed at one end centrally on side plate 4 and projects from its inner face axially across the body to a termination a short distance laterally out from the plane of the corresponding flange 3. A sleeve 9 rotatably surrounds shaft 8 and at the end adjacent side plate 4 is formed with a ratchet wheel 10 which cooperates with a pawl 11 mounted on said side plate and engaged by a spring 12. The other end of sleeve 9 terminates adjacent the free end of shaft 8.

A fish line reel spool 13, including a hub 14, is rotatably disposed within the body; the hub being turnably supported on sleeve 9. Fibrous friction discs 15 and 16 surround said sleeve 9 between one end of hub 14 and ratchet wheel 10, and between the other end of hub 14 and disc hub 6 of rotatable side plate 5, respectively. The surfaces against which said friction discs engage are machined so as to present smooth parallel faces as is desirable. The end of hub 14 adjacent friction disc 15 includes toothed wheel 17 which cooperates with a spring actuated "click" finger 18; this portion of the device serving only as an audible signal to indicate that the reel spool is turning.

The disc hub 6 of rotatable side plate 5 is keyed as at 19 on the adjacent end of sleeve 9 so as to permit sliding movement lengthwise thereof but to prevent relative rotation therebetween. A circular finger member or knob 20, of sufficient thickness to project outwardly of side plate 5, is threaded on the free end of sleeve 9; there being a spring washer 21 disposed between the member 20 and hub 6. A headed screw 22 projects through a central opening and is threaded into the adjacent end of shaft 8; this screw merely being set to prevent escape of member 20 from sleeve 9 and in no way prevents manipulation of said member. An oil feed passage 23 is bored in shaft 8 from the hole for screw 22 to a point of discharge within hub 14 of reel spool 13.

In use, the above described reel functions as follows: When member 20 is retracted on the sleeve 9, the reel spool runs free as there is then no appreciable holding friction exerted by friction discs 15 and 16. When it is desired that a drag be applied to the reel spool, as is desirable when certain fish which tend to "run" are being hooked, the member 20 is advanced on the sleeve, which movement causes the friction discs 15 and 16 to take effect, as is obvious. The amount of friction or drag is of course dependent upon the adjustment of said member 20.

When the spool is being rotated by the line being pulled or run out, the side plate 5 and handle 7 do not move, for the reason that there is fixed connection between said side plate and ratchet wheel 10 which can only rotate in a direction the same as the direction of rotation of the spool required to wind in the line.

To wind in the line, member 20 is further advanced if necessary to increase the effectiveness of friction discs 15 and 16 so as to provide a substantially non-slip drive between handle 7 and reel spool 13.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a friction drag assembly for a fishing reel having a body, a spool in the body, and a rotatable side plate and crank unit mounted for movement axially of the spool whereby to alter the extent of friction drag, said assembly including an element projecting axially through the side plate, an adjustment member threaded on said element for adjustment lengthwise thereof, and a spring washer between said adjustment member and the adjacent portion of the side plate, the inner face of said adjustment member being recessed for the reception of said spring washer.

WALTER W. FISCUS.